Dec. 13, 1966  W. A. EISELE  3,291,885
RADAR JAMMING SIMULATOR
Filed March 18, 1965  4 Sheets-Sheet 1

INVENTOR.
WILLIAM A. EISELE
BY
Lawrence S. Epstein
ATTORNEYS

INVENTOR.
WILLIAM A. EISELE
BY
Laurence S. Epstein
ATTORNEYS

Dec. 13, 1966  W. A. EISELE  3,291,885
RADAR JAMMING SIMULATOR
Filed March 18, 1965  4 Sheets-Sheet 4

INVENTOR.
WILLIAM A. EISELE
BY
Laurence S. Epstein
ATTORNEYS

United States Patent Office 3,291,885
Patented Dec. 13, 1966

3,291,885
RADAR JAMMING SIMULATOR
William A. Eisele, Pleasantville, N.Y., assignor, by mesne assignments, to the United States of America as represented by the Secretary of the Navy
Filed Mar. 18, 1965, Ser. No. 440,962
4 Claims. (Cl. 35—10.4)

This invention relates generally to a display simulator, and more particularly to an improved display of radar targets and jamming sources.

Operational jamming consists of strong modulated radiation, which is transmitted continuously in time from a point source. When a radar receiver is tuned to the same frequency as the jammer, the signal received by any of the lobes of the receiver antenna is displayed in polar presentation. If the jamming signal is of adequate strength at the receiver antenna, and the lobe gain provides sufficient signal to appear on a plan position indicator (hereinafter referred to as PPI), the radial sweep line is intensified on the phosphor on the PPI CRT. If the receiver antenna is symmetrical a 360° rotation of the antenna will develop an intensified pattern on the PPI CRT which is symmetrical about the bearing of the jamming radiation source. The range between the receiver antenna and the source determines the actual signal strength of the jamming indication, and together with the receiving antenna beam pattern, determines the actual jamming indication on the PPI display.

In the PPI display device deflection of the electron beam of the cathode ray tube is produced by the magnetic field of the deflection coil. Video signals are applied to the grid of the cathode ray tube, so that they increase the intensity of the luminous spot. The spot is deflected in two ways: (1) It is moved from the center of the tube to the edge at a definite rate to indicate range. (2) The radial line caused by the range sweep of the spot is rotated around the face of the tube as the antenna turns in azimuth. A polar coordinate is utilized in target presentation on an operational PPI. Each target is displayed at a particular conjunct bearing and range as the receiver antenna rotates through the particular bearing of this target. Thus, each target is displayed as a briefly intensified dot on the PPI CRT, one per conjunct revolution of the antenna and the PPI sweep. Each target appears sequentially in bearing, and if two targets are at the same bearing, although different ranges, they will be displayed simultaneously.

On conventional synthesized PPI's, target presentation is in cartesian coordinates. The position of each target is represented by X and Y voltages provided by a pair of potentiometers. These pairs of simulated voltages respectively represent the north, south and the east, west positions of each simulated target in the geographic area. A commutator in an arbitrary sequence, samples each of these pairs of voltages. The position of the receiver antenna, or "own ship" is similarly represented by a pair of voltages. Each target pair of voltages is algebraically added to the antenna pair of voltages to provide north-south and east-west difference voltages for each target with respect to the antenna or "own ship" represented on the PPI. These difference voltages are applied directly to the deflection amplifiers of the conventional synthetic PPI, which in turn controls the electromagnetic deflection of the beam in the PPI CRT. The commutator also provides a pulse which intensifies the beam of the CRT after it has settled to a steady state position for the particular target pair of voltages or channel being sampled. Conventional read-out means may then be applied. Thus, it may be seen that the conventional synthetic PPI displays a series of intensified dots which represent the position of the various targets, with respect to the associated receiver antenna or "own ship." These dots appear continuously on the display and do not represent the appearance of a normal target as scanned by radar antenna in the operational equipment as described above. The targets on the conventional synthetic PPI are actually scanned in a sequence which has no relationship to the bearing from the radar antenna.

It is therefore, an object of this invention to properly display simulated signals representing jamming and target points.

It is another object of this invention to present jamming data on the synthetic PPI in a polar coordinate system.

It is a further object of this invention to convert present synthetic systems from an arbitrary sequential scan of target data and rectangular coordinates into a scan in terms of the bearing of the simulated search antenna.

It is still a further object of this invention to present target and jamming data in a visual display as a function of bearing of the search antenna, antenna beam pattern, range of the jamming vehicle, power of the jamming radar, and type of jamming signal.

Other objects and many of the attendant advantages of this invention will be readily appreciated as the same becomes better understood by reference to the following detailed description when considered in connection with the accompanying drawings wherein.

Figure 3A:
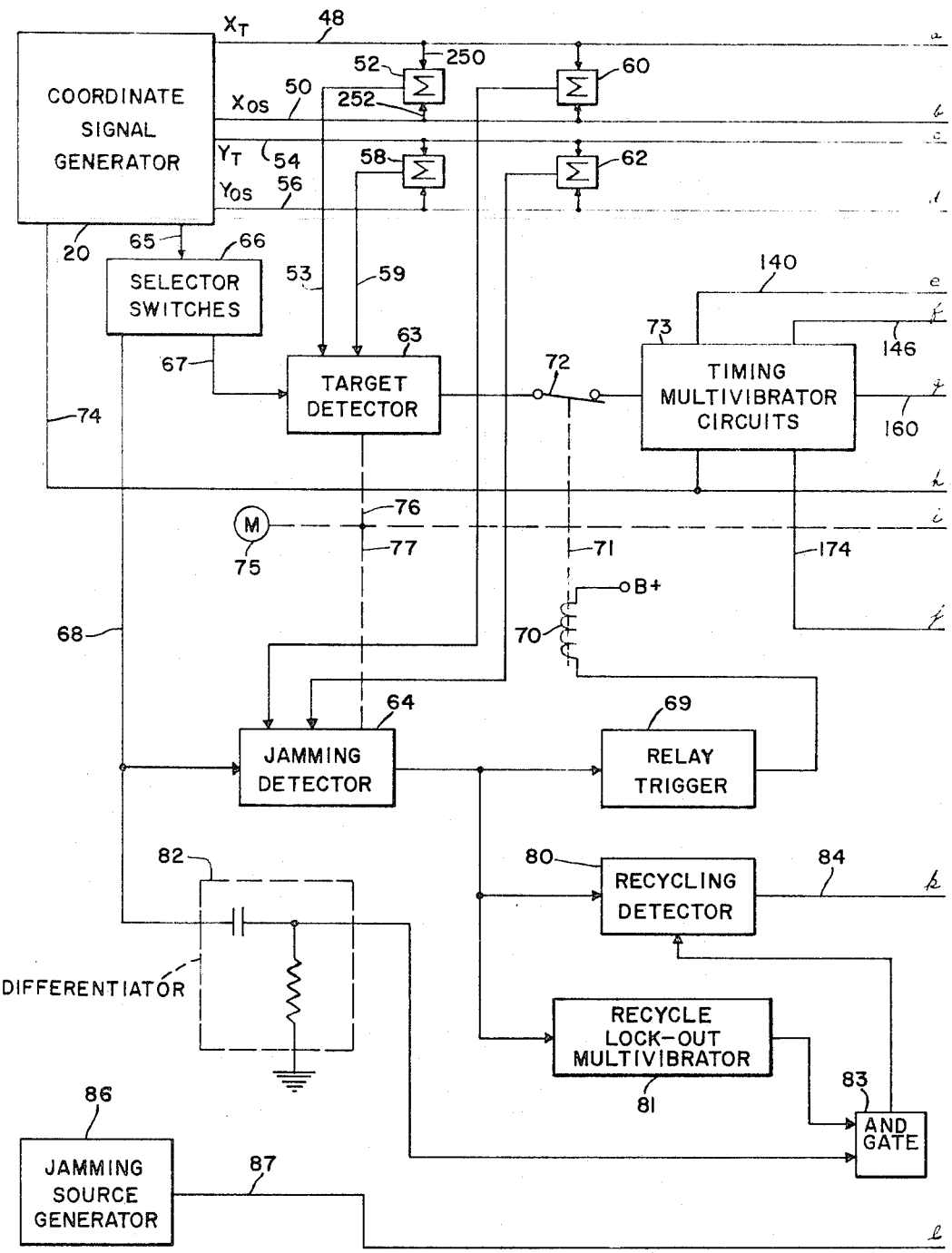
Figure 3B:
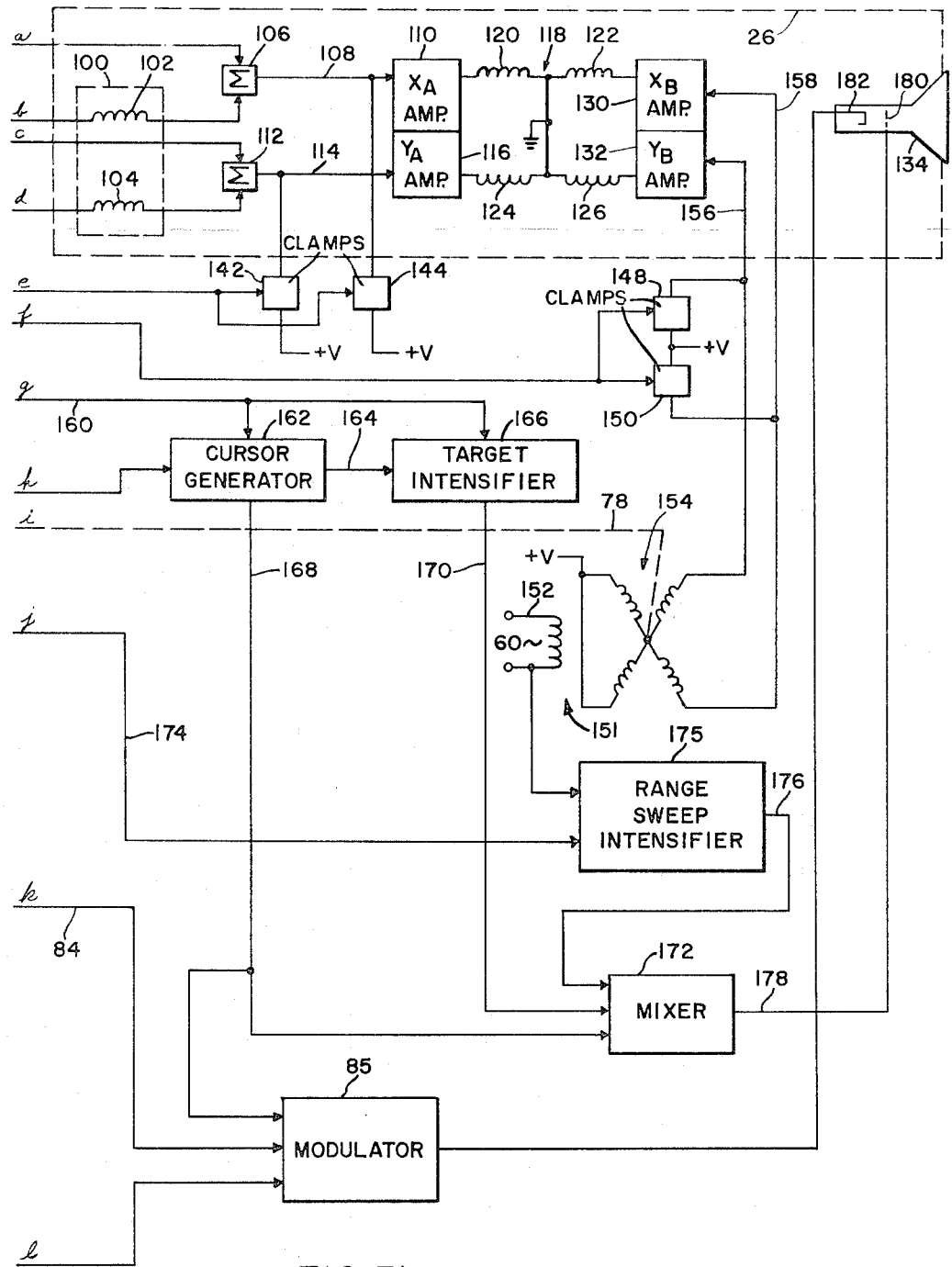

FIGS. 3a and 3b, taken together, illustrate in functional schematic, the simulated jamming system of the invention.

Figure 4:
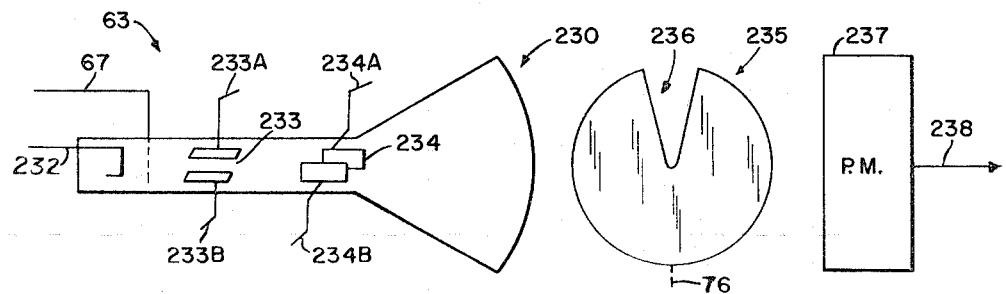

FIG. 4 is an exploded view illustrating detail of the target detector of the present invention.

Figure 5:
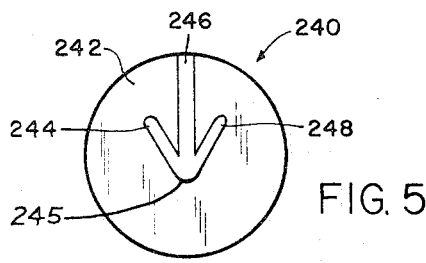

FIG. 5 is a plan view illustrating detail of the jamming detector mask utilized by the present invention.

Figure 6:
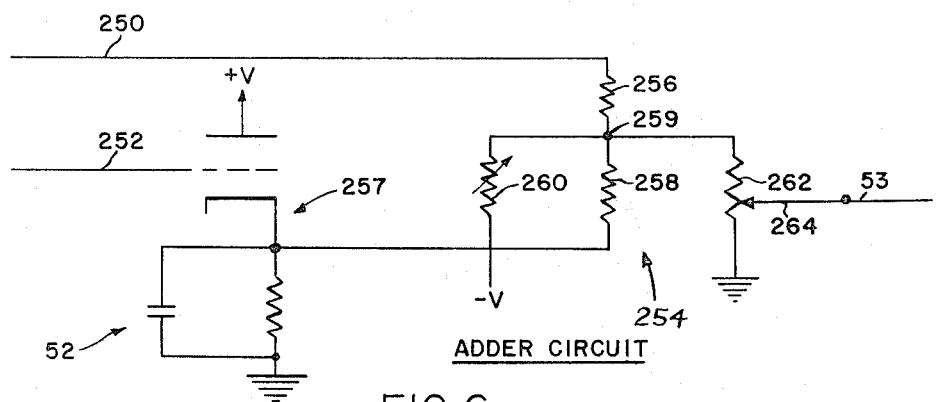

FIG. 6 is a schematic illustration and represents an adder circuit identified in block form in FIG. 3.

Figure 7:
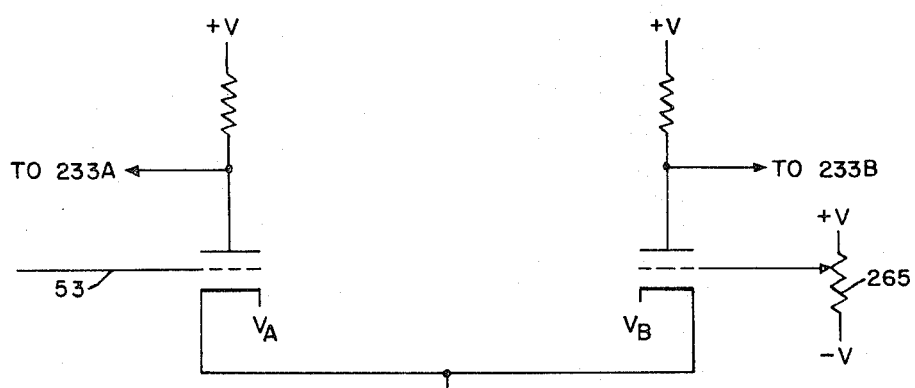

FIG. 7 is a schematic illustration and disclosed a detail of the deflection circuits utilized by the present invention.

To convert the synthetic cartesian PPI presentation into a realistic synthetic polar presentation, an auxiliary photo optical focusing device is operationally connected to the conventional synthetic PPI. This auxiliary photo optical device comprises a small cathode ray tube focused by means of an optical lens through a rotating radar beam pattern mask onto a photo electric pick-up. The mask is rotated at the normal rotation rate of the simulated radar antenna. The radial aperture in this mask is made to represent the beam width of a typical radar antenna main lobe. Additional intensity pulses representing target positions are fed to this photo optical device. It is seen therefore, that the photo electric pick-up will detect any of those targets which are visible through the aperture in the mask. This will occur only upon a coincidence of a target intensifying pulse and the passing of a mask aperture. Targets are therefore presented in synchronism with the antenna bearing and in proper sequential polar coordinates. The output of the photo multiplier tube is presented on the display PPI. Since the display PPI still receives the target positions signals conventionally available thereto, the resultant display now appears to be scanned by a low speed radar antenna. An additional photo optical device is provided to receive jammer targets conventionally available to this synthetic PPI and to select these targets in their polar sequence. This unit operates in much the same manner as the unit described above.

Figure 1:
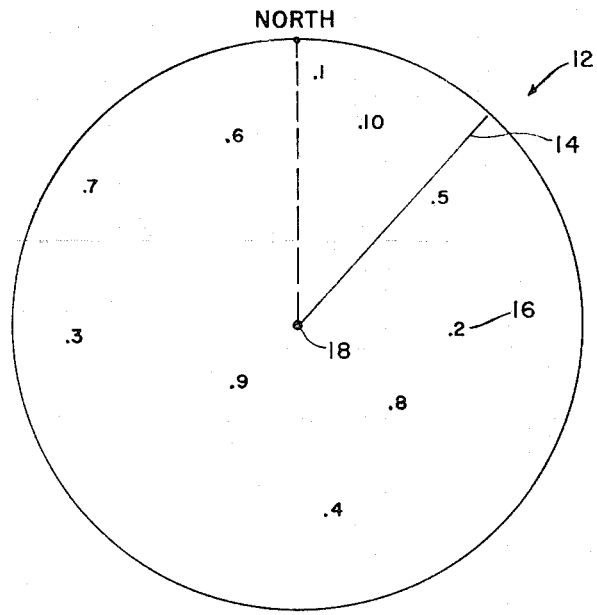
FIG. 1 illustrates target presentation in a conventional synthetic PPI.

Referring now to FIG. 1, there is shown a conventional synthetic PPI display screen, operating without the modification of the present invention. Particularly, there is shown a screen 12, having thereon a cursor 14, which radially traverses the screen, indicating the presence or location of targets, by a series of numerals 16. The center and origin of said screen 18, represents the "own ship" position. The synthetic targets presented on screen 12 are randomly displayed, but they are generated sequentially, wherein the order of presentation of the targets normally would be 1, 2, 3, 4, 5, 6, 7, 8, 9 and 10. It is seen, however, that as the cursor 14 traverses the screen, the sequence of the target presentation as the antenna rotates through 360°, will have a presentation order of 1, 10, 5, 2, 8, 4, 9, 3, 7, and 6. Obviously, there is no relationship between the order in which this data is made available by radial sweep and its actual presentation from the synthetic generators.

Figure 2:
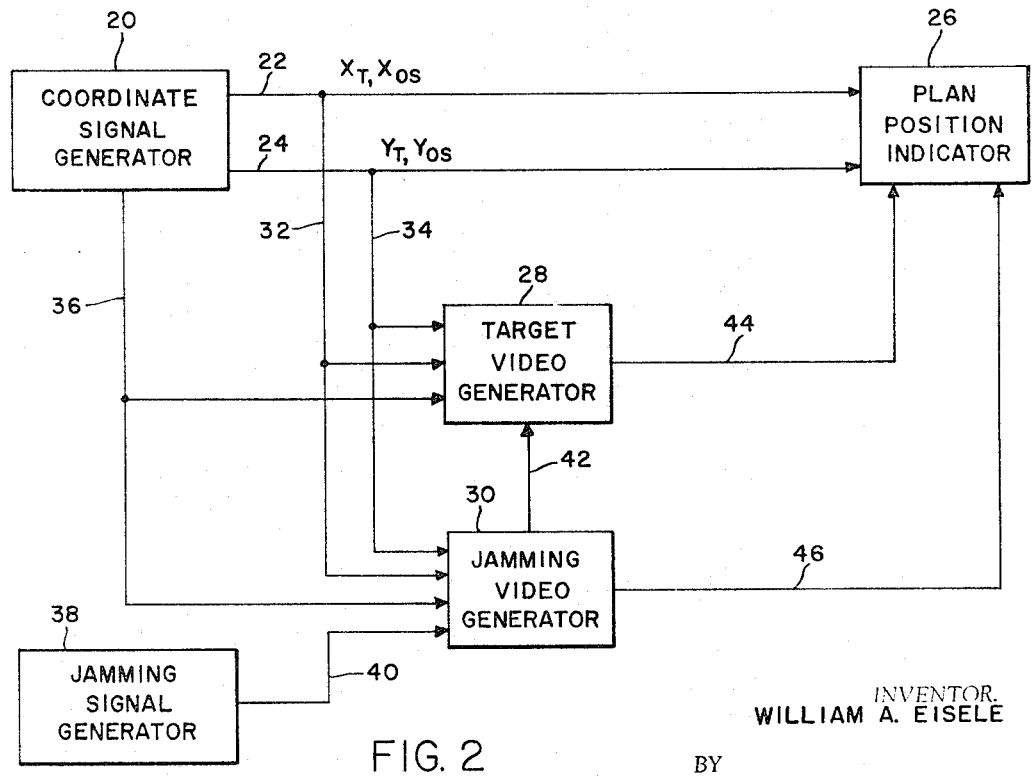
FIG. 2 is a block diagram illustrating one form of the display simulator of the invention.

In order to present a more realistic synthetic presentation, the modification to a standard conventional synthetic PPI is made as shown in FIG. 2. Shown therein is a standard coordinate signal generator 20, which transmits signals representative of "own ship" and target position over lines 22 and 24 respectively to PPI unit 26. The modification entails the addition of target video generator 28 and jamming video generator 30, each responsive to X deflection signals over line 32 and Y deflection signals over line 34. Further inputs to each video generator unit representative of intensity pulses are provided over line 36. Jamming signal generator 38 presents a jamming signal over line 40 to the jamming video generator unit 30. An interconnection 42 is provided between the jamming video generator and the target video generator for reasons described below. The output of each generator unit 28 and 30 is then provided on lines 44 and 46 respectively to the PPI unit 26.

Turning now to FIG. 3 for a more detailed presentation, therein is disclosed a coordinate signal generator 20, which generates signals representative of the target and "own ship" X deflection signals along lines 48 and 50, respectively, which are summed in adder unit 52 having an output 53. Similar signals representing target and "own ship" Y deflection are generated and presented on lines 54 and 56 and summed in adder unit 58 having an output appearing on line 59. A third adder unit 60 is connected in parallel with adder unit 52, while a fourth adder unit 62 is connected in parallel with the adder unit 58. The outputs of adder units 52 and 58 are then coupled to target detector 63 while the output of adder units 60 and 62 are connected to jamming detector 64. Coordinate signal generator 20 further generates a signal that is representative of intensity which is presented along line 65 to selector switching unit 66. This unit is a standard two position switch which routes pulses along either line 67 to target detector 63 or line 68 to jamming detector 64. When an output appears from jamming detector 64, it is fed to relay trigger 69 which in turn fires relay 70, causing mechanical coupling 71 to open switch 72 thereby disconnecting the output of target detector 63 from the input of timing multivibrator circuits 73. Target detector 63 and jamming detector 64 are synchronously operated by means of motor unit 75, which simulates a radar bearing antenna drive. This motor unit 75 is mechanically coupled by means of shaft 76 and 77 to target detector unit 63 and jamming detector unit 64 respectively. A further shaft 78 is provided to drive a resolver 151 which provides a radial sweep for the display PPI, and is described below in more detail. Output pulses from the jamming detector 64 which are fed to trigger 69 as described above are also fed to re-cycling detector 80 and re-cycle lock-out multivibrator unit 81. Intensity pulses appearing on line 68 are fed to differentiator unit 82 and then, simultaneously with the output of re-cycle lock-out multivibrator 81, are fed to and gate 83 which in turn controls the output of re-cycling detector 80. When there is a coincidence of pulses on the inputs of and gate 83, the re-cycling detector 80 is opened and an output appears on line 84 which is fed to modulator unit 85. Jamming source generator 86 provides a high intensity source signal along line 87 to modulator unit 85. A third input to modulator 85 is provided by cursor generator 162 along line 168 described below. The output of modulator 85 is then fed directly to the display PPI unit 26. Display unit PPI 26 is conventional in so far as it receives signals representing X and Y deflection from coordinate generator 20. As is illustrated in FIG. 3b, a cursor resolver unit 100 is disclosed having cursor resolver coils 102 and 104, which serve to generate the cursor reference sweep. Target deflection signals representing X coordinate positions are summed in adder 106 having an output 108 which is fed to deflection amplifier $X_a$ 110. Signals representative of Y deflection coordinate positions are summed in adder 112 having an output 114, which is fed to $Y_a$ deflection amplifier 116. The outputs of the deflection amplifiers are fed into deflection coil unit 118 which comprises coils 120, 122, 124 and 126. The deflection coils are differentially split and are provided with inputs from $X_b$ deflection amplifier 130 and $Y_b$ deflection amplifier 132 respectively. The operation of the unit is controlled by properly spaced timing pulses produced by a multi-stage multivibrator unit 73. This unit produces a series of control pulses. A pulse appearing upon line 140 is conveyed through clamping units 142 and 144 which serve to clamp the inputs of the $Y_a$ deflection amplifier 116 and the $X_a$ deflection amplifier 110, so as to cause the CRT beam to be deflected to the center of the screen at certain intervals as described in more detail below. Another pulse appearing on line 146 is conveyed to clamping units 148 and 150, to serve to clamp the output of a radial sweep unit. This radial sweep output is provided by a motor driven resolver 151 having a primary excited by an AC line 152 and a secondary 154 which serves to generate two voltages of magnitudes proportional to the sine and co-sine respectively of the shaft angle of the resolver. These voltages are fed along lines 156 and 158 respectively to amplifiers $Y_b$ 132 and $X_b$ 130 respectively. A further pulse from multivibrator circuits 73 appears on line 160 and serves cursor generator 162 thereby placing a target disable signal on target intensifier 166. Cursor generator 162 serves to gate the pulse appearing along line 74. The output of cursor generator appears on line 168, and the output of target intensifier unit 166 appears on line 170. Both of these signals are conveyed to mixing unit 172. A final pulse appears from multivibrator circuits 73 along line 174 into range sweep intensifier unit 175, which is provided with a second input which is derived from the 60 cycle line of resolver primary 152. The output of this unit is on output line 176 and is fed into the input of mixer unit 172 whose output appears on line 178 and is fed to the display PPI.

In operation, target detector 63 and jamming detector 64 serve to select input signals fed thereto in polar sequence. This is accomplished by optical masks which are rotated in synchronism with the bearing of the radar antenna simulated by motor unit 75. These masks are disclosed in more detail in FIGS. 4 and 5.

Although the signals on the outputs of units 63 and 64 now appear to be presented on a polar coordinate basis when displayed on PPI unit 26, the electron beam and display PPI 26 still wastes a considerable period of time each cycle of the synthesizing commutator within unit 20. This is due to the displacement to the positions of those targets which are not at that time visible to the aperture of the mask in target detector unit 63. This useless deflection is precluded by clamping the display PPI deflection amplifier inputs for those non-jammer targets which do not for the given commutator cycles produce an intensifier pulse. This is accomplished by a pulse appearing at the proper time from timing multivibrator unit 73 along line 140 into clamps 142 and 144. When the inputs are clamped, the beam is deflected to the center of the display PPI. During the interval that the non-jammer targets are not within the mask aperture and the display PPI deflection amplifier inputs are clamped, jammer sources may then be displayed in polar presentation.

When non-jamming targets are to be displayed, a pulse appears on line 146 from multivibrator unit circuit 73 and is transmitted to clamps 148 and 150 which serve to disable the radial sweep and simultaneously enable the non-jammer target position network, so as to display the non-jammer sources.

Turning now to FIG. 4, a detail of the target detector unit 63 is disclosed. Structurally, this unit is equivalent to the jamming detector unit 64 of the present invention. Particularly, intensity pulses are fed in along line 67 to CRT 230. This serves to increase the intensity of the pulses by increasing the stream of electrons flowing from the biased cathode 232. The stream of electrons flow through deflection plates 233 having upper plate 233A and lower plate 233B. Each of these plates are biased by the deflection circuit disclosed in FIG. 7 which in turn is controlled by the adder circuit disclosed in FIG. 6. The beam then passes through a second set of deflection plates 234 having right plate 234A and left plate 234B which in turn are similarly connected to similar deflection and adder circuits. The beam then strikes the surface of the CRT 230. The phosphor on the tube face is selected for short persistence and emits a sharp blue flash when pulsed by the electron beam. The light emitted by the CRT then strikes mask 235 having a notch 236 cut therein to form the aperture. This notch may be made wider or narrower as is desired for simulated system resolution. This mask is driven by shaft 76 which is coupled to the radar antenna drive motor 75. Upon a coincidence of a pulse appearing on the face of the CRT and the aperture 236, detection of the target is made by photo multiplier 237, which presents an output signal along line 238.

FIG. 5 discloses the type of mask that could be used in a typical jamming simulator. The jammer mask 240, therein contains slots for the side lobes 244 and 248, the back lobe 245 and the main lobe 246. The mask itself is completely opaque as is indicated by 242.

The particular designs illustrated in FIGS. 4 and 5 are intended only as illustrative. The present invention is not limited to such designs and other designs may be utilized to present desired types of jamming and detection patterns.

FIG. 6 discloses an adder circuit which may be utilized for each of the adder blocks described in the foregoing figures, such as element 52. These adder circuits provide the target displacement voltages for the auxiliary CRT's 230 and are used in conjunction with the deflection circuits to provide for the input for each of the detector units. Particularly, inputs from lines 48, 50 (FIG. 3a) are presented along lines 250 and 252. Element 254 is a Kirchoff adder of the standard type. Target signals are fed in through element 256 while "own ship" information is fed through an isolating cathode follower circuit 257 and then through element 258 to common point 259. Zeroing is accomplished by variable potentiometer 260 while a further potentiometer 262 is provided for the adjustment of the output gain of said circuit which appears on variable tap 264. Tap 264 is connected to output 53.

The output of the auxiliary adders is applied to a differential amplifier used as a push-pull deflection amplifier. The output of the adder is fed to one grid of said amplifier and a centering voltage placed on the other grid of the said amplifier. As shown in FIG. 7, a standard differential amplifier circuit is employed. The output from the adder circuit is applied to the grid of A section of the tube V by line 53 from adder 52. Variable potentiometer 265 is employed for zero centering on the other half of the differential amplifier $V_B$. The output of the differential amplifier of FIG. 7 appears on the plates of each of the respective tubes VA and VB in the differential circuit and is applied by lines 233A, 233B to the deflection plates 233 of CRT 230.

It will be understood that each of the other adders 58, 60, 62, 106, and 112 may comprise a circuit similar to the adder circuit shown in FIG. 6 for adder 52. Likewise it will be understood that the target detector 63 includes a second deflection circuit (not shown) similar to that of FIG. 7 but receiving input along line 59 from adder 58. This second deflection circuit in target detector 63 serves the deflector plates 234 in the same manner as the circuit of FIG. 7 serves deflection plates 233. It will be further understood that the jamming detector 64 of the present embodiment of the invention includes two deflection circuits similar to that of FIG. 7, one of which is provided with an input from adder 60 and serves one set of deflection plates in a third cathode ray tube similar to tube 230, and the other of which is provided with an input from adder 62 and serves the other set of deflection plates in the third cathode ray tube.

The operation of the simulator in displaying non-jammer targets will now be described in a step by step manner. In this mode, the selector switches 66 are disposed to pass beam intensifier pulses along line 67 to the target detector 63 for the CRT thereof, the pulses being timed to correspond to own ship and target coordinate signals which are passed from generator 20 along lines 48, 50, 54 and 56 to the adders 52, 58 and 106, 112. The adders 52, 58 combine the coordinate signals and, via the deflector circuits described above, apply necessary voltages to the deflector plates of the CRT 230 of the detector 63 so that CRT 230 displays briefly luminous spots on the face thereof indicating the positions of the targets in PPI format, but not in simulated antenna swept sequence.

When the pulse intensified beam of the CRT 230 of detector 63 coincides with the rotating aperture 236 of the mask 235 associated therewith, the photo-multiplier 237 detects a luminous spot and sends a pulse through now closed switch 72 to the multivibrator circuits 73 which sends a pulse via line 140 to clamping units 142, 144 so that adders 106, 112, amplifiers 110, 116, and deflection coils 120, 124 are effective to deflect the beam of the CRT 134 to a position on the face thereof corresponding to the position of the luminous spot on the CRT of the detector 63 which caused the output pulse applied by the photo-multiplier to the multivibrator circuits 73. Also, the multivibrator circuits 73 send a pulse via line 160 to target intensifier 166 which in turn sends an intensifying pulse via line 170, mixer 172 and line 178 to the CRT 134 in proper time for the beam thereof to be intensified to produce a luminous spot on the face thereof corresponding to the spot detected by the photo-multiplier on the CRT of detector 63 through the rotating mask aperture thereof. These events are repeated for each optical coincidence of the intensified beam of the CRT of detector 63 and the aperture of the rotating mask.

Thus, it will be appreciated that the beam of the display CRT 134 will present target indication in a polar sequence determined by cooperation of the rotating mask 235, the cathode ray tube 230 and the photo-multiplier 237. It will also be appreciated that the clamping means 142, 144 eliminate unnecessary deflection of the beam of the CRT 134 when no intensifying pulse is forthcoming for the display CRT.

Now, when the selector switches 66 are disposed to pass intensifier pulses to the auxiliary cathode ray tube of the jamming detector 64, and when deflection of the beam thereof by operation of adders 60, 62 and associated deflection circuits provides optical coincidence with the aperture of mask 240 cooperating therewith, the photo-multiplier of the detector 64 sends a jammer pulse to relay trigger 69 which actuates solenoid 70 in a sense to open switch 72 to interrupt non-jammer pulses coming from target detector 63. The timing multivibrator circuits 73 thereupon actuate target clamps 142, 144, explained above and sends unclamping pulses via line 146 to clamping units 148, 150 which enables the radial resolver 151 to apply simulated antenna sweep signals via deflection amplifiers 130, 132. The timing multivibrator circuits 73 also send enabling pulses at this time to the range sweep intensifier 175 which in turn provides intensifying signal through mixer 172 to the display CRT 134.

Additionally, the jammer pulse from the detector 64 goes to the recycle lock-out multivibrator 81 and to the re-cycling detector 80. The latter is under the control of AND gate 83 which, upon receipt of simultaneous signals from differentiator 82 and the recycle lock-out multivibrator 81, permits the detector 80 to generate a beam shape envelope via line 84 to control the gain of modulator 85. The modulator 85 receives a jamming signal from the jamming source generator 86 and, in response to the gain control of detector 80, injects the jamming signal into the radial sweep of the display CRT 134. Thus, although the generator 86 may be continuously operative, the modulator 85 is controlled to inject the jammer signals only at the appropriate times determined by the jam detector 64 and recycle trigger pulses from differentiator 82. Moreover, the beam shape envelope from the detector 80 serves to variably intensify the radial sweep of the display CRT to appropriately simulate the presentation of actual jamming signals on an actual radar display.

From the foregoing it will be recognized that the target video generator 28, the jamming video generator 30, and the jamming signal generator 38 of FIG. 2 are broken down into more discrete elements in FIGS. 3a and 3b, and that some of the latter elements such as the mixer 172 of FIG. 3b may be considered to be included in each of the target and jamming video generators of FIG. 2. Thus, the target video generator of FIG. 2 may be said to include the target detector 63, adders 52, 58, the timing multivibrator circuits 73, the target intensifier 166, and the mixer 172, while the jamming video generator may be said to include the jamming detector, adders 60, 62, the timing multivibrator circuits 73, the range sweep resolver 151, the range sweep intensifier, the modulator 85 and the mixer 172. The jamming signal generator 38 of FIG. 2 has been designated as a jamming source generator 86 in FIG. 3a merely to differentiate between the general block diagram of the former figure and the more detailed functional schematic of the latter figure. The generators themselves are the same.

Obviously many modifications and variations of the present invention are possible in the light of the above teachings. It is therefore to be understood that within the scope of the appended claims, the invention may be practiced otherwise than as specifically described.

What is claimed is:
1. In a radar display simulator, the combination comprising:
   coordinate signal generator means for generating coordinate signals representative of target positions and own ship position;
   a first cathode ray tube having beam deflection means and operatively connected to said coordinate signal generator means to provide deflection of the beam of said first cathode ray tube to positions on the face thereof corresponding to simulated non-jammer targets;
   a second cathode ray tube having beam deflection means and operatively connected to said coordinate signal generator means to provide deflection and intensification of the beam of the second cathode ray tube so that said non-jammer targets are indicated as luminous spots on the face of said second cathode ray tube;
   light responsive means disposed to receive light emitted from said luminous spots on said second cathode ray tube and operatively connected to said first cathode ray tube so as to increase the intensity of the beam thereof in response to increases in light received by said light responsive means;
   rotatable mask means disposed between the face of said second cathode ray tube and said light responsive means, said mask means comprising an aperture;
   drive means connected to said mask means for effecting rotation thereof so that said aperture sweeps the face of said second cathode ray tube at a rate corresponding to simulated rotation of an antenna, whereby optical coincidences of the beam of said second cathode ray tube and said aperture are detected by said light responsive means and intensity of said beam of said first cathode ray tube is varied to produce non-jammer target indicating luminous spots on the face thereof in a polar sequence corresponding to the sweep of said aperture.

2. The combination defined in claim 1 and further comprising:
   rotary resolver means connected to said drive means for synchronous operation with said mask means, said resolver means providing first and second signals the magnitudes of which correspond to the sine and cosine of the angle of rotation of said mask means, said first and second signals being applied to said deflection means of said first cathode ray tube to provide a radial sweep of the beam thereof;
   a jammer signal generator for generating jam signals characteristic of jammer targets;
   a third cathode ray tube having beam deflection means and operatively connected to said coordinate signal generator to provide deflection and intensification of the beam of the third cathode ray tube so that jammer targets are indicated as luminous spots on the face thereof;
   second light responsive means disposed to receive light emitted from said luminous spots on said third cathode ray tube;
   second rotatable mask means disposed between the face of said third cathode ray tube and said second light responsive means, said second mask having an aperture and being connected to said drive means for rotation is synchronism with said resolver means whereby optical coincidences of the aperture of said second mask means and the beam of said third cathode ray tube are detected by said second light responsive means to provide a jamming detection output;
   modulator means connecting said jammer signal generating means to said first cathode ray tube and responsive to said jamming detection output to inject said jam signals into said radial sweep whenever a jamming target is within said aperture of said second mask means.

3. The combination defined in claim 2 and further comprising:
   clamp means responsive to the first mentioned light responsive means and operative to normally clamp said coordinate target signal deflection inputs to said first cathode ray tube whereby said coordinate target signals are effective to deflect the beam of said first cathode ray tube from the center position thereof only when optical coincidence of said beam of said second cathode ray tube and said aperture of said first mask means occurs.

4. The combination defined in claim 3 and comprising:
   deflection amplifier means having differentially split channels as the connection between the deflection means of said first cathode ray tube and said coordinate signal generator and as the connection between the first cathode ray tube and said resolver means, whereby presentation on the first cathode ray tube of both non-jammer target information and radial sweep and jammer information can be effected.

References Cited by the Examiner
UNITED STATES PATENTS
2,977,687    4/1961    Bailey et al. _____ 35—10.4

CHESTER L. JUSTUS, *Primary Examiner.*

T. H. TUBBESING, *Assistant Examiner.*